(12) United States Patent
Liao et al.

(10) Patent No.: US 7,959,759 B2
(45) Date of Patent: Jun. 14, 2011

(54) APPARATUS AND METHOD FOR MANUFACTURING DOUBLE LAYER AIR CYLINDER TYPE AIR ENCLOSURE

(75) Inventors: Chieh-Hua Liao, Sindian (TW); Yaw-Shin Liao, Sindian (TW); Yao-Chuan Liao, Sindian (TW)

(73) Assignee: Chieh Hua LIAO, Sindian (TW)

( * ) Notice: Subject to any disclaimer, the term of this patent is extended or adjusted under 35 U.S.C. 154(b) by 582 days.

(21) Appl. No.: 11/964,227

(22) Filed: Dec. 26, 2007

(65) Prior Publication Data
US 2008/0156420 A1  Jul. 3, 2008

(30) Foreign Application Priority Data
Dec. 29, 2006  (TW) ............................ 95149975 A

(51) Int. Cl.
*B29C 65/00* (2006.01)
*B32B 37/00* (2006.01)

(52) U.S. Cl. ................... 156/308.4; 156/290; 156/292; 156/324

(58) Field of Classification Search ............... 156/290, 156/292, 297, 308.2, 308.4, 309.6, 324; 141/10; 206/522
See application file for complete search history.

(56) References Cited

U.S. PATENT DOCUMENTS

| 4,076,872 A | 2/1978 | Lewicki et al. |
| 4,850,912 A | 7/1989 | Koyanagi |
| 5,261,466 A | 11/1993 | Kashiharaseitai |
| 2004/0265523 A1* | 12/2004 | Koyanagi et al. ............ 428/35.7 |
| 2005/0263205 A1* | 12/2005 | Koyanagi et al. ............ 141/10 |
| 2006/0131202 A1* | 6/2006 | Kramer ..................... 206/522 |

FOREIGN PATENT DOCUMENTS

| EP | 0621208 A | 10/1994 |
| JP | H5-95851 U | 12/1993 |

* cited by examiner

Primary Examiner — John L Goff, II
(74) Attorney, Agent, or Firm — Rabin & Berdo, P.C.

(57) ABSTRACT

An apparatus and method for manufacturing a double layer air cylinder type air enclosure uses a middle film conveying unit to provide a middle film, a plurality of inner film conveying units to provide a plurality of inner films to stack on two sides of the middle film, a first hot sealing apparatus to hot-seal the plurality of inner films and the middle film to allow two sides of the middle film to be respectively formed with a check valve with an air passageway, an outer film conveying unit to provide two sheets of outer film to respectively stack on the outside of the check valve and a second hot sealing apparatus to hot-seal the plurality of outer films and the middle film to allow an air storable air chamber to be formed between the middle film and the each sheet of outer film. Whereby, air enters the air chamber causes the air chamber to be filled with air and expanded via the air passageway, air in the air chamber compresses the check valve to shield the air passageway to enable air in the air chamber not to be leaked out to attain to the air locking.

9 Claims, 12 Drawing Sheets

APPARATUS AND METHOD FOR MANUFACTURING DOUBLE LAYER AIR CYLINDER TYPE AIR ENCLOSURE

CROSS-REFERENCES TO RELATED APPLICATIONS

This non-provisional application claims priority under 35 U.S.C. §119(a) on Patent Application No(s). 095149975 filed in Taiwan, R.O.C. on Dec. 29, 2006, the entire contents of which are hereby incorporated by reference.

FIELD OF THE INVENTION

The present invention relates to an apparatus and method for manufacturing an air enclosure, and more particularly to an apparatus and method for manufacturing a double layer air cylinder type air enclosure.

BACKGROUND

A conventional way for packing an article with a cushioning agent mostly is wrapping around the article with a plastic sheet on which a plurality of small raised air bags are projected to attain to the shock-absorbed cushioning functions. But the shock absorption capability of the small air bags is limited such that the cushioning and the shock absorption effects to a larger shock or impulse cannot be attained. Therefore, an air packing bag is developed to take as a wrapping cushioning means.

However, the air bag made from polyethylene (PE) is easy to be pierced through by a sharp acute angle of a packed article or an adjoining angle of hardware; once a small broken hole appears on the air packing bag, fluid in the air packing bag is then leaked out. Please refer to The U.S. Pat. No. 4,850,912 entitled as "Container for sealingly containing a fluid", The U.S. Pat. No. 5,261,466 entitled as "Process for continuously filling fluid into a plurality of closed bags", The U.S. Pat. No. 5,427,830 entitled as "Continuous, inflatable plastic wrapping material" and Japan utility model patent publishing No. H5-95851 entitled "Seal bag for fluids". Each air cylinder of each air packing bag disclosed thereby is disposed with an independent check valve; when parts of air cylinders are broken, only air in the broken air cylinders is leaked out and air in other unbroken air cylinders is not caused to leak out. Although this kind of structure allows entire air not to be leaked out when the parts of air cylinders are broken, but broken parts of the air cylinders will cause the cushioning protection function to be lost to cause a packed article to be damaged or scratched easily.

SUMMARY

For manufacturing an air packing bag out of which air is not entirely leaked out after being damaged and solving a problem that the cushioning protection of the air packing bag is lost due to the air leaking, the present invention is proposed.

The present invention proposes an apparatus for manufacturing a double layer air cylinder type air enclosure, comprising:
a middle film conveying unit, used for providing at least one sheet of middle film;
a plurality of inner film conveying unit, used for providing a plurality of inner films to stack at two side of the middle film;
a first hot sealing apparatus, used for hot-sealing the plurality of inner films and the middle film to allow check valves with an air passageway to be respectively formed at two sides of the middle film;
two outer film conveying unit, used for provide two outer films to respectively stack outside the check valve; and
a second hot sealing apparatus, used for hot-sealing the plurality of outer films and the middle film to an air storable air chamber to be formed between the middle film and each outer film. When air enters the air chamber via the air passageway to cause the air chamber to be filled with air and expanded, air in the air chamber compresses the check valve to seal the air passageway to enable air in the air chamber not to be leaked out to attain to the air locking, and when any air chamber is broken, another air chamber can still provide the cushioning protection effect.

The present invention also proposes another apparatus for manufacturing a double layer air cylinder type air enclosure, comprising:
two outer film conveying units, used for providing two sheets of outer film;
a plurality of inner film conveying unit, used for providing a plurality of inner films to stack between two sheets of outer film;
two first hot sealing apparatuses, respectively used for hot sealing the plurality of inner films and the one sheet of outer film to form a check valve with an air passageway;
a middle film conveying unit, used for providing at least one sheet of middle film; and
a second hot sealing apparatus, used for hot-sealing the plurality of outer films and the middle film to an air storable air chamber to be formed between the middle film and each outer film. When air enters the air chamber via the air passageway to cause the air chamber to be filled with air and expanded, air in the air chamber compresses the check valve to seal the air passageway to enable air in the air chamber not to be leaked out to attain to the air locking, and when any air chamber is broken, another air chamber can still provide the cushioning protection effect.

The present invention also proposes a method for manufacturing a double layer air cylinder type air enclosure, comprising the following steps:
providing at least one sheet of middle film;
stacking a plurality of inner films to cause the middle film to be lain between the plurality of inner films;
hot-sealing the plurality of inner films and the middle film to allow check valves with an air passageway to be respectively formed at two sides of the middle film;
stacking two sheets of outer film to cause the middle film and the plurality of inner films to be lain between the two sheets of outer film; and
hot-sealing the two sheets outer films and the middle film to cause an air storable air chamber to be formed between the middle film and each sheet of outer film. When air enters the air chamber via the air passageway to cause the air chamber to be filled with air and expanded, air in the air chamber compresses the check valve to seal the air passageway to enable air in the air chamber not to be leaked out to attain to the air locking, and when any air chamber is broken, another air chamber can still provide the cushioning protection effect.

The present invention also proposes another method for manufacturing a double layer air cylinders type air enclosure, comprising the following steps:
providing at least two sheets of outer film;
stacking a plurality of inner films to be lain between the two sheets of outer film;

hot-sealing at least one sheet of inner film and at least one sheet of outer film to cause each sheet of outer film and each sheet of inner film to form a check valve with an air passageway;

providing at least one sheet of middle film;

stacking the plurality of inner films to cause the middle film to be lain between the plurality of inner films; and hot-sealing the two sheets of outer film and the middle film to cause an air storable air chamber to be formed between the middle film and each sheet of outer film. When air enters the air chamber via the air passageway to cause the air chamber to be filled with air and expanded, air in the air chamber compresses the check valve to seal the air passageway to enable air in the air chamber not to be leaked out to attain to the air locking, and when any air chamber is broken, another air chamber can still provide the cushioning protection effect.

BRIEF DESCRIPTION OF THE DRAWINGS

The present invention can be more fully understood by reference to the following description and accompanying drawings, in which.

DETAILED DESCRIPTION

Figure 1:
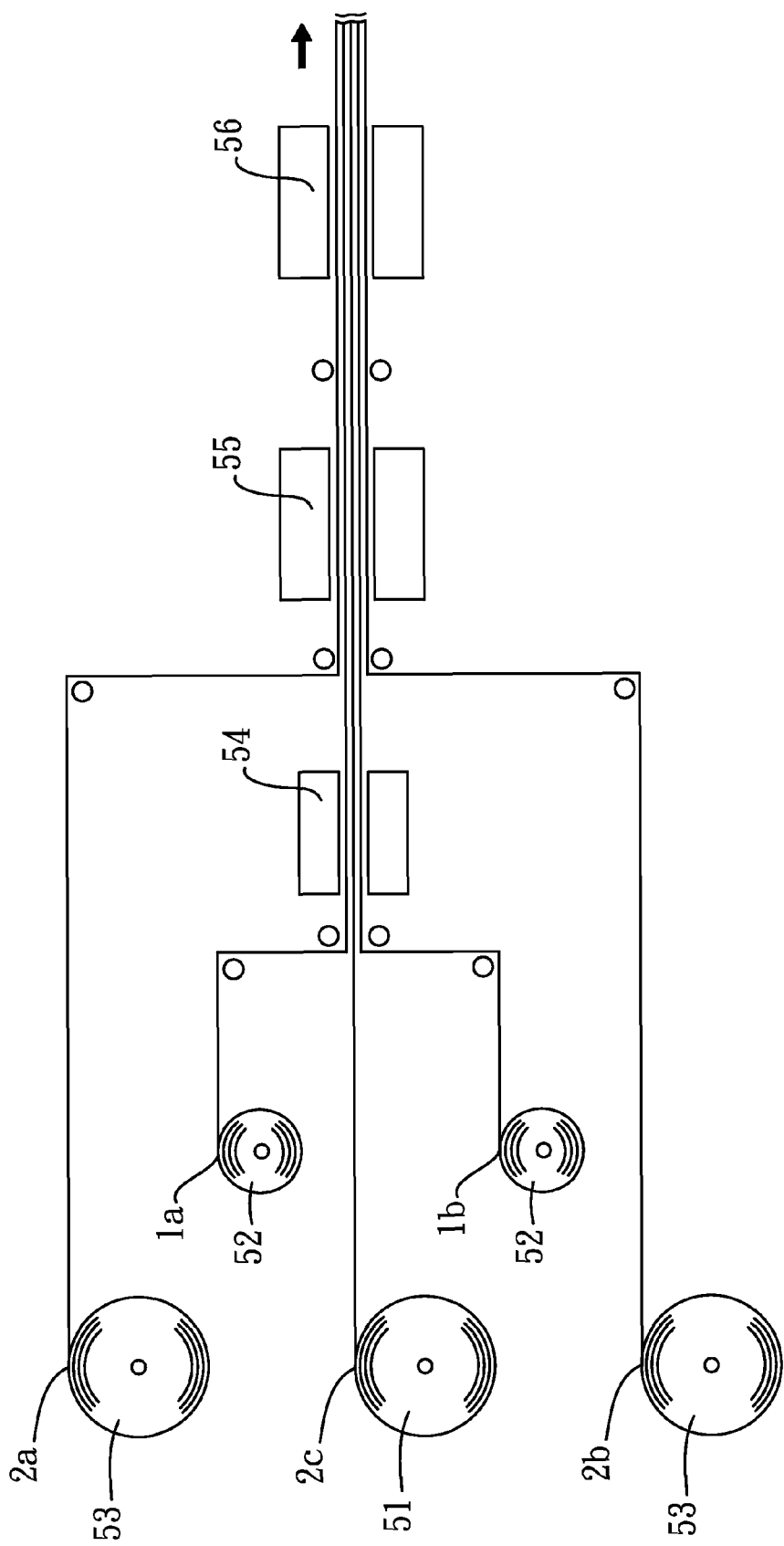
FIG. 1 is a schematic view, showing a structure of an apparatus for manufacturing a double layer air cylinder type air enclosure of a first preferred embodiment according to the present invention.
Figure 2:
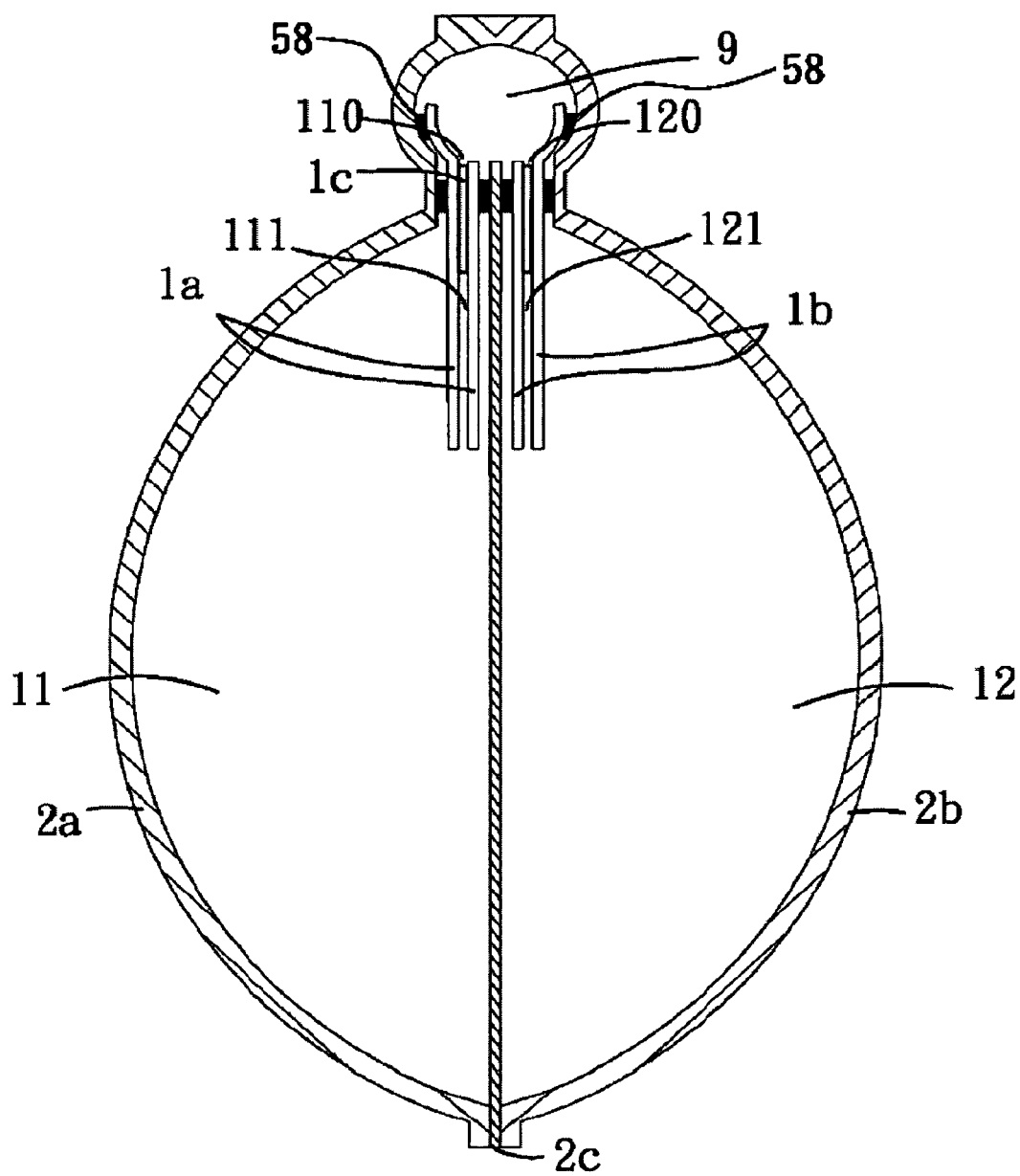
FIG. 2 is a cross sectional view, showing an air enclosure manufactured by the apparatus shown in FIG. 1 after being filled with air.
Figure 3:
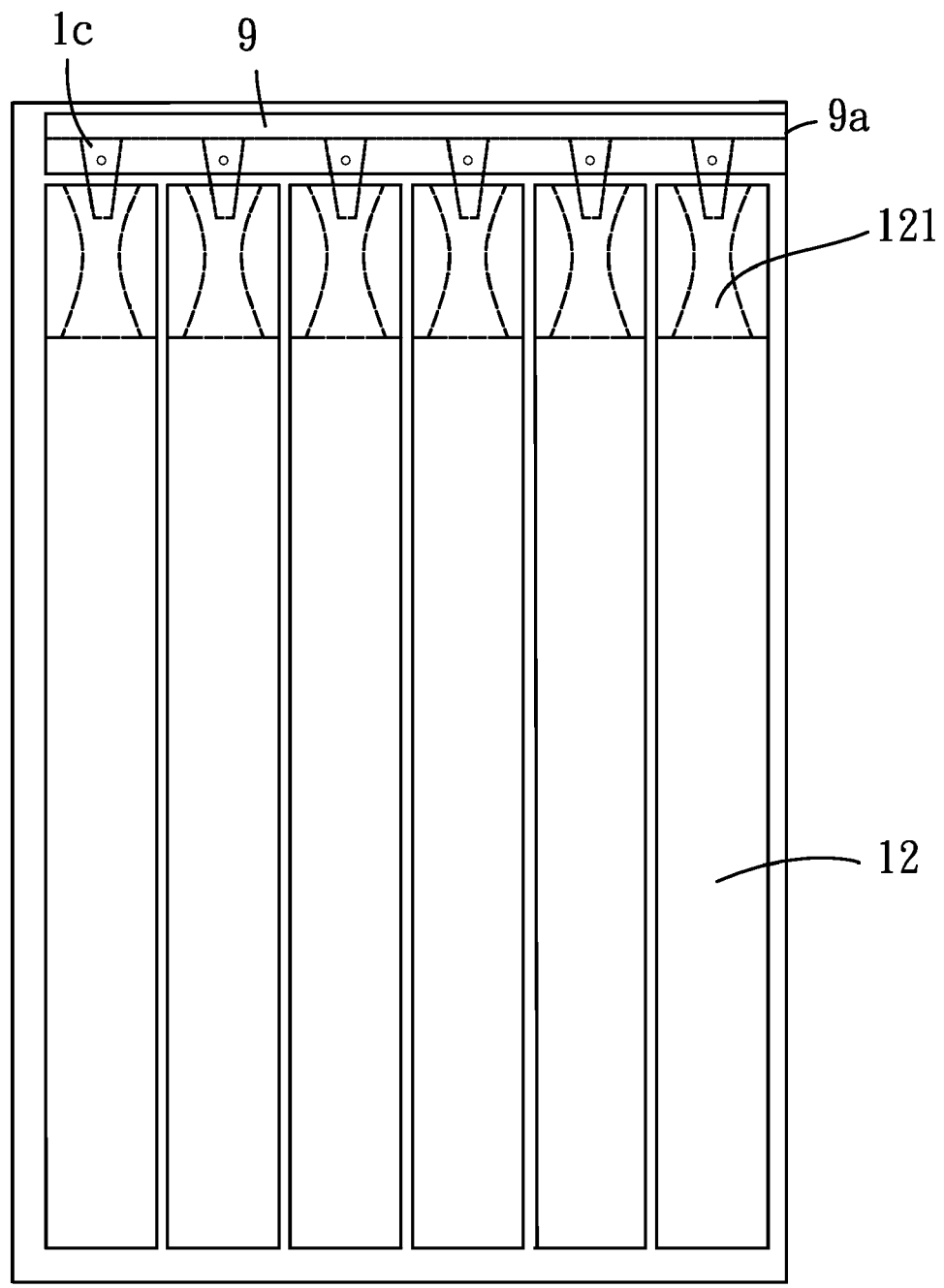
FIG. 3 is a plane view, showing an air enclosure manufactured by the apparatus shown in FIG. 1 before being filled with air.

Please refer to FIGS. 1, 2 and 3. FIG. 1 is a schematic view, showing a structure of an apparatus for manufacturing a double layer air cylinder type air enclosure of a first preferred embodiment according to the present invention. FIG. 2 is a cross sectional view, showing an air enclosure manufactured by the apparatus shown in FIG. 1 after being filled with air. FIG. 3 is a plane view, showing an air enclosure manufactured by the apparatus shown in FIG. 1 before being filled with air.

An apparatus for manufacturing a double layer air cylinder type air enclosure comprises a middle film conveying unit 51, an inner film conveying unit 52, an outer film conveying unit 53, a first hot sealing apparatus 54 and a second hot sealing apparatus 55.

The middle film conveying unit 52 is used for providing at least one sheet of middle film 2c.

The inner film conveying unit 52 is used for providing at least one sheet of first inner film 1a and at least one sheet of second inner film 1b respectively stacked at two sides of the middle film 2c.

The first hot sealing apparatus 54 is used for hot-sealing the first inner film 1a, the second inner film 1b and the middle film 2c to allow a first check valve 110 with a first air passageway 111 and a second check valve 120 with a second air passageway 121 to be respectively formed at two sides of the middle film 2c.

The outer film conveying unit 53 is used for providing the first outer film 2a and the second outer film 2b to respectively stack on outer sides of the first check valve 110 and the second check valve 120.

The second hot sealing apparatus 55 is used for hot-sealing the first outer film 2a, the second outer film 2b and the middle film 2c to allow the middle film 2c and the first outer film 2a to be formed with a first chamber 11, and the middle film 2c and the second outer film 2b to be formed with a second air chamber 12.

A structure disclosed by the present invention further comprises a node hot-sealing unit 56 used for hot-sealing the first outer film 2a and the second outer film 2b to form a plurality of nodes to allow the first air chamber 11 and the second air chamber 12 to be bended along the plurality of nodes.

After the middle film conveying unit 51 provides one sheet of middle film 2c, the inner film conveying unit 52 provides two sheets of first inner film 1a and two sheets of second inner film 1b to respectively stack on two sides of the middle film 2c, in which a heat resistant material 1c is spread in advance between the two sheets of first inner film 1a and between the two sheets of second inner film 1b, for example, by means of heat resistant resin or ink printing. The two sheets of first inner film 1a and the middle film 2c are adhered together through the first hot sealing apparatus 54 to form the first check valve 110 and the first air passageway 111 is formed between the two sheets of first inner film 1a and in the meantime, the two sheets of second inner film and the middle film 2c are adhered together by means of hot sealing to form the second check valve 120 and the second air passageway 121 is formed between the two sheets of second inner film 1b. And then, the first outer film 2a is provided to stack on an outer side of the first check valve and the second outer film 2b is provided to stack on an outer side of the second check valve through the outer film conveying unit 53. Furthermore, the middle film 2c and the first outer film 2b are adhered to each other to form the first air chamber 11 and in the meantime, the middle film 2c and the second outer film 2b are adhered to each other to form the second air chamber 12 through the second hot sealing apparatus. Besides, one end of the first outer film 2a and one end of the second outer film 2b are adhered to each other by hot sealing to form an air filling passageway 9 with an air filling entrance 9a between the first outer film 2a and the second outer film 2b. One of the outer films 2a and 2b and one of the inner films 1a and 1b are adhered at combination points 58 in the air filling passageway 9. Each of the combination points 58 sticks one of the inner films 1*a* and 1*b* to one of the outer films 2*a* and 2*b*.

The length of one of the two inner films 1*a* is shorter than the length of the other of the two inner films 1*a*, the length of one of the two inner films 1*b* is shorter than the length of the other of the two inner films 1*b*, and the films with the shorter length are more adjacent to the middle film 2*c*.

Air entering the air filling entrance 9*a* expands the air filling passageway 9 to cause two sheets of first inner film 1*a* to be pulled away outward and in the meantime, cause two sheets of second inner film 1*b* to be pulled away outward to allow each first air chamber 11 and each second air chamber 12 to be filled with air and expanded. Thus, internal air pressure of the first air chamber 11 compresses the two sheets of first inner film 1*a* to attach onto the meddle film 2*c* closely to cover the first air passageway 111 to shield the first air chamber 11. Besides, internal air pressure of the second air chamber 12 compresses the two sheet of second inner film 1*b* to attach onto the middle film 2*c* closely to cover the second air passageway 121 to shield the second air chamber 12 thereby being capable of allowing air in the first air chamber 11 and the second air chamber 12 not to be leaked out to attain to the air locking effect.

From the description mentioned above, not only air filling speeds of the first air chamber 11 and the second air chamber 12 can be faster to reduce the time needed for the air filling, but also when one of the first air chamber 11 and the second air chamber 12 is broken, another one is not influenced to keep air tight such that the cushioning protection can be still provided to maintain the shock absorbing cushioning capability because the first air chamber 11 and the second air chamber 12 are independent to each other.

Figure 4:
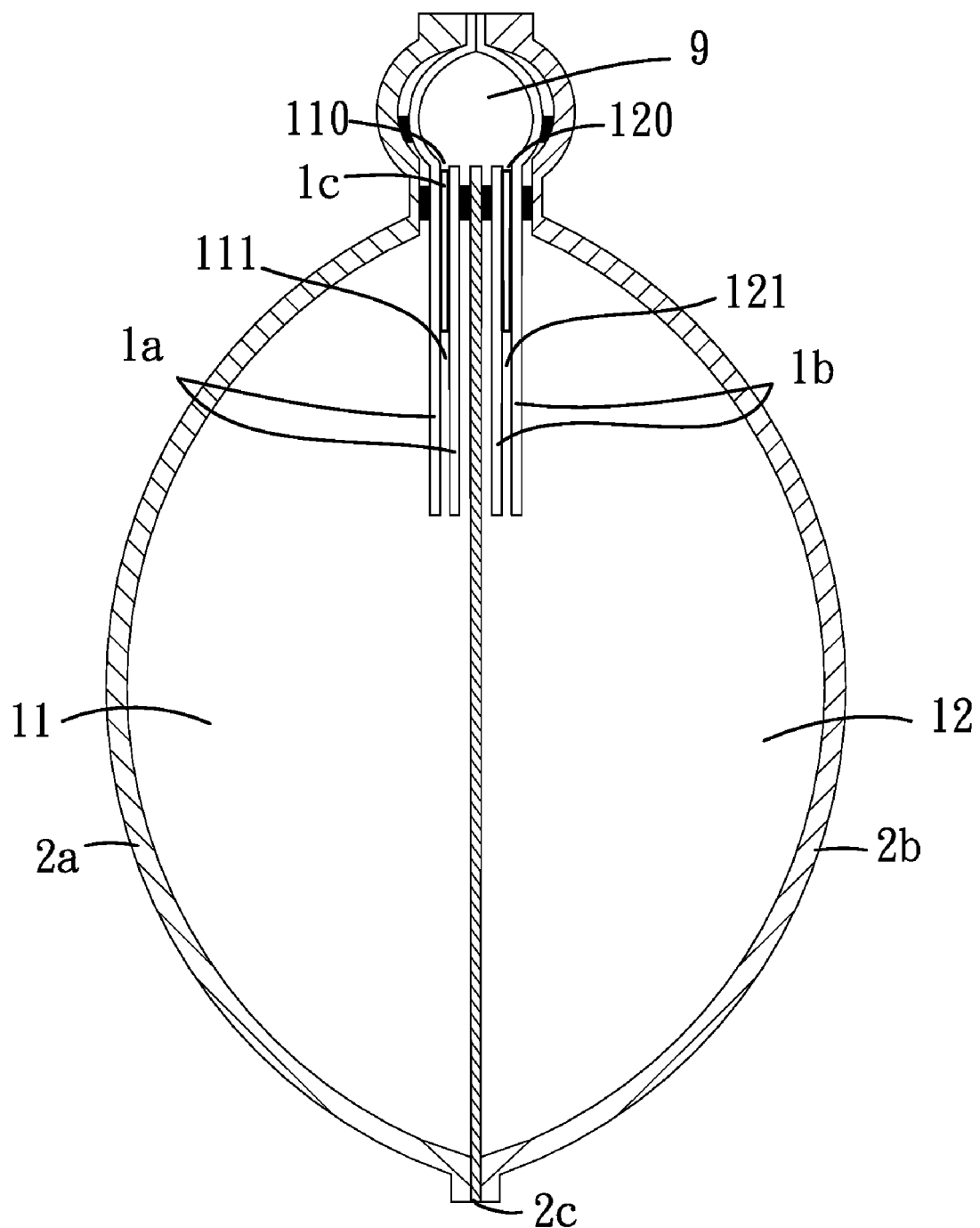
FIG. 4 is a cross sectional view, showing another air enclosure manufactured by the apparatus shown in FIG. 1 after being filled with air.

Please refer to FIG. 4. FIG. 4 is a cross sectional view, showing another air enclosure manufactured by the apparatus shown in FIG. 1 after being filled with air.

The second hot sealing apparatus 55 hot-seals the middle film 2*c* and the first outer film 2*a* to form the first air chamber 11 and in the meantime, hot-seals the middle film 2*c* and the second outer film 2*b* to form the second air chamber 12, and hot-seals one end of the first outer film 2*a* and one end of the second outer film 2*b* to form the air filling passageway 9 with the air filling entrance 9*a* between the first inner film 1*a* and the second inner film 1*b*.

Furthermore, the first hot sealing apparatus 54 may also hot-seal one end of the first inner film 1*a* and one end of the second inner film 1*b* directly to form the air filling passageway 9 with the air filling entrance 9*a* between the first inner film 1*a* and the second inner film 1*b*.

Figure 5:
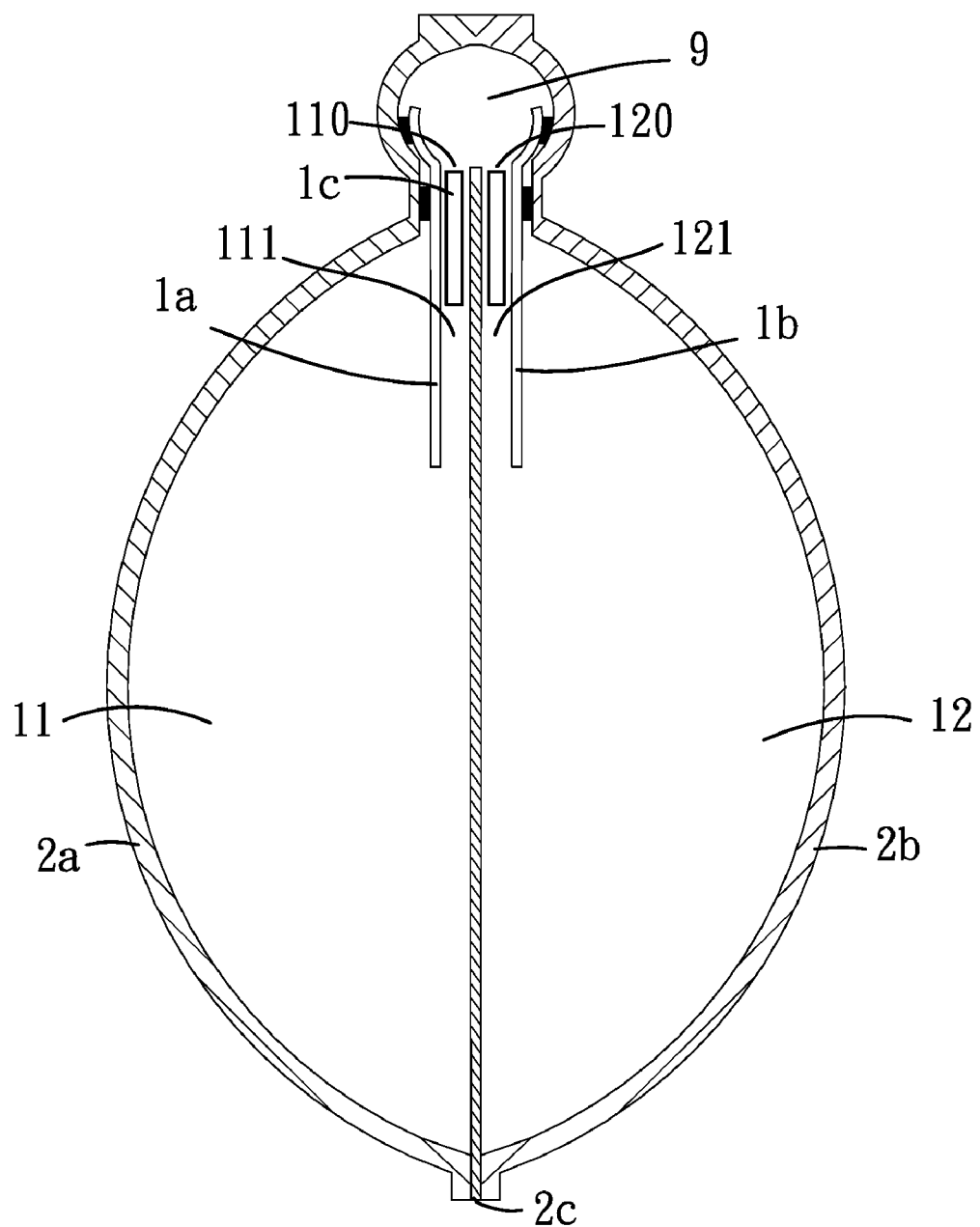
FIG. 5 is a cross sectional view, showing another air enclosure manufactured by the apparatus shown in FIG. 1 after being filled with air.

Please refer to FIG. 5. FIG. 5 is a cross sectional view, showing another air enclosure manufactured by the apparatus shown in FIG. 1 after being filled with air.

The inner film conveying unit 52 provided one sheet of first inner film 1*a* and one sheet of second inner film 1*b* to respectively stack on two sides of the middle film 2*c* after the middle film conveying unit 51 provides one sheet of middle film 2*c*, in which a heat resistant material 1*c* is spread in advance on the first inner film 1*a* and the second inner film 1*b*, for example, by means of heat resistant resin or ink printing. The first inner film 1*a* and the middle film 2*c* are adhered to each other to form the first check valve 110 and the first air passageway 111 between the first inner film 1*a* and the middle film 2*c* and in the meantime, the second inner film 1*b* and the middle film 2*c* are adhered to each other to form the second check valve 120 and the second air passageway 121 between the second inner film 1*b* and the middle film 2*c* through the first hot sealing apparatus 54. Next, the outer film conveying unit 53 provides the first outer film 2*a* to stack on an outside of the first check valve 110 and the second outer film 2*b* to stack on the outside of the second check valve 120, and the second hot sealing apparatus 55 then hot-seals the middle film 2*c* and the first outer film 2*a* to form the first air chamber 11 and in the meantime, hot-seals the middle film 2*c* and the second outer film 2*b* to form the second air chamber 12, and hot-seals one end of the first outer film 2*a* and one end of the second outer film 2*b* to form the air filling passageway 9 with the air filling entrance 9*a* between the first outer film 2*a* and the second outer film 2*b*.

Figure 6:
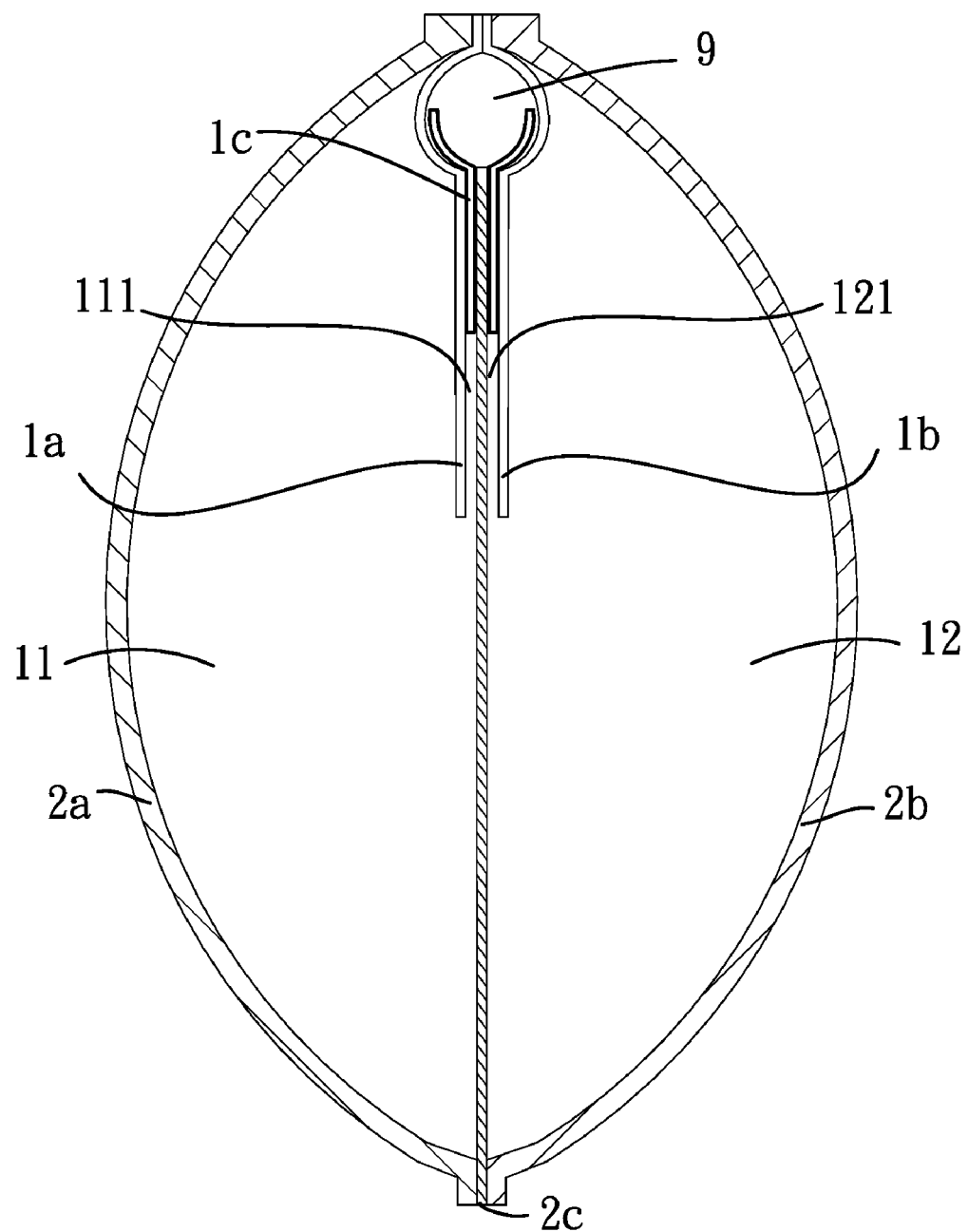
FIG. 6 is a cross sectional view, showing another air enclosure manufactured by the apparatus shown in FIG. 1 after being filled with air.

Please refer to FIG. 6. FIG. 6 is a cross sectional view, showing another air enclosure manufactured by the apparatus shown in FIG. 1 after being filled with air.

Figure 7:
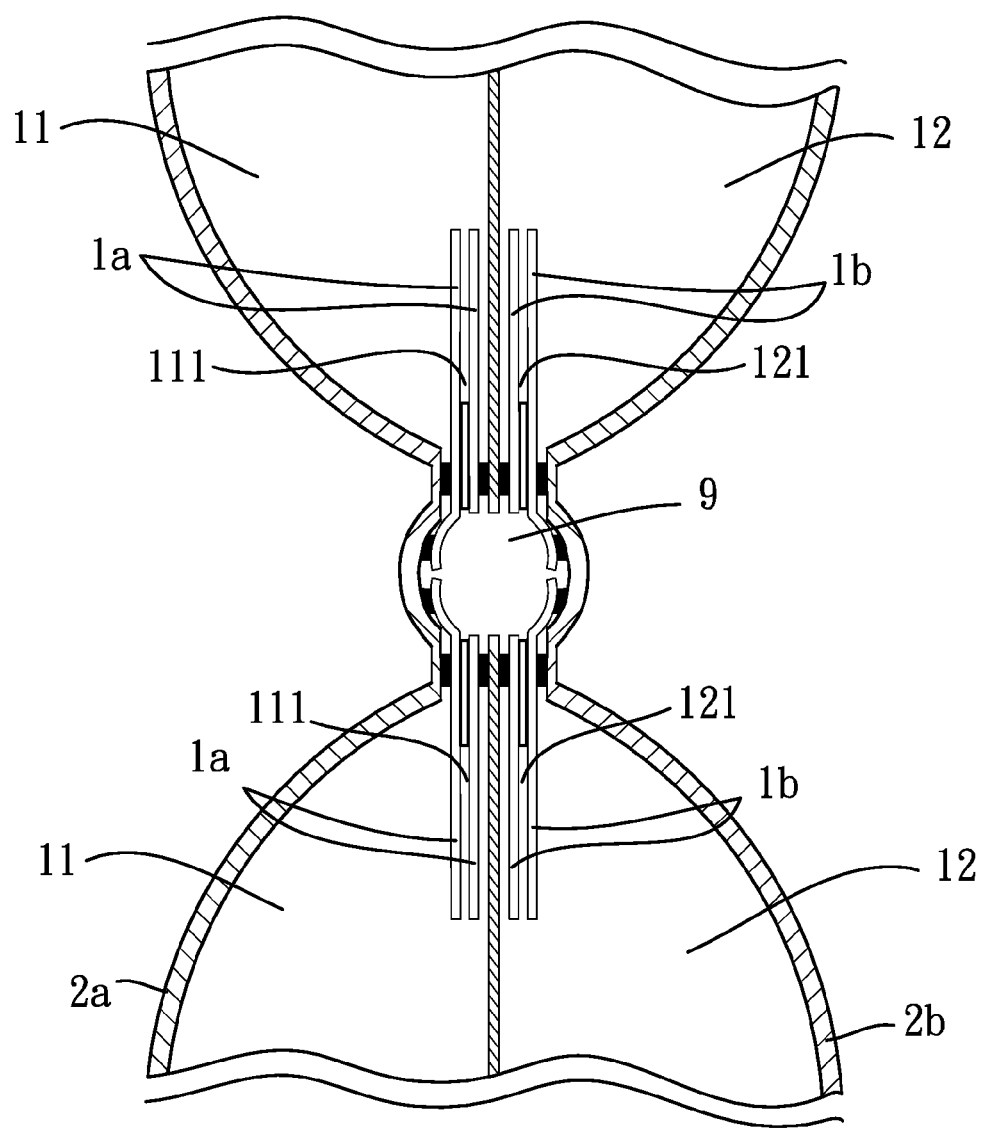
FIG. 7 is a cross sectional view, showing another air enclosure manufactured by the apparatus shown in FIG. 1 after being filled with air.
Figure 8:
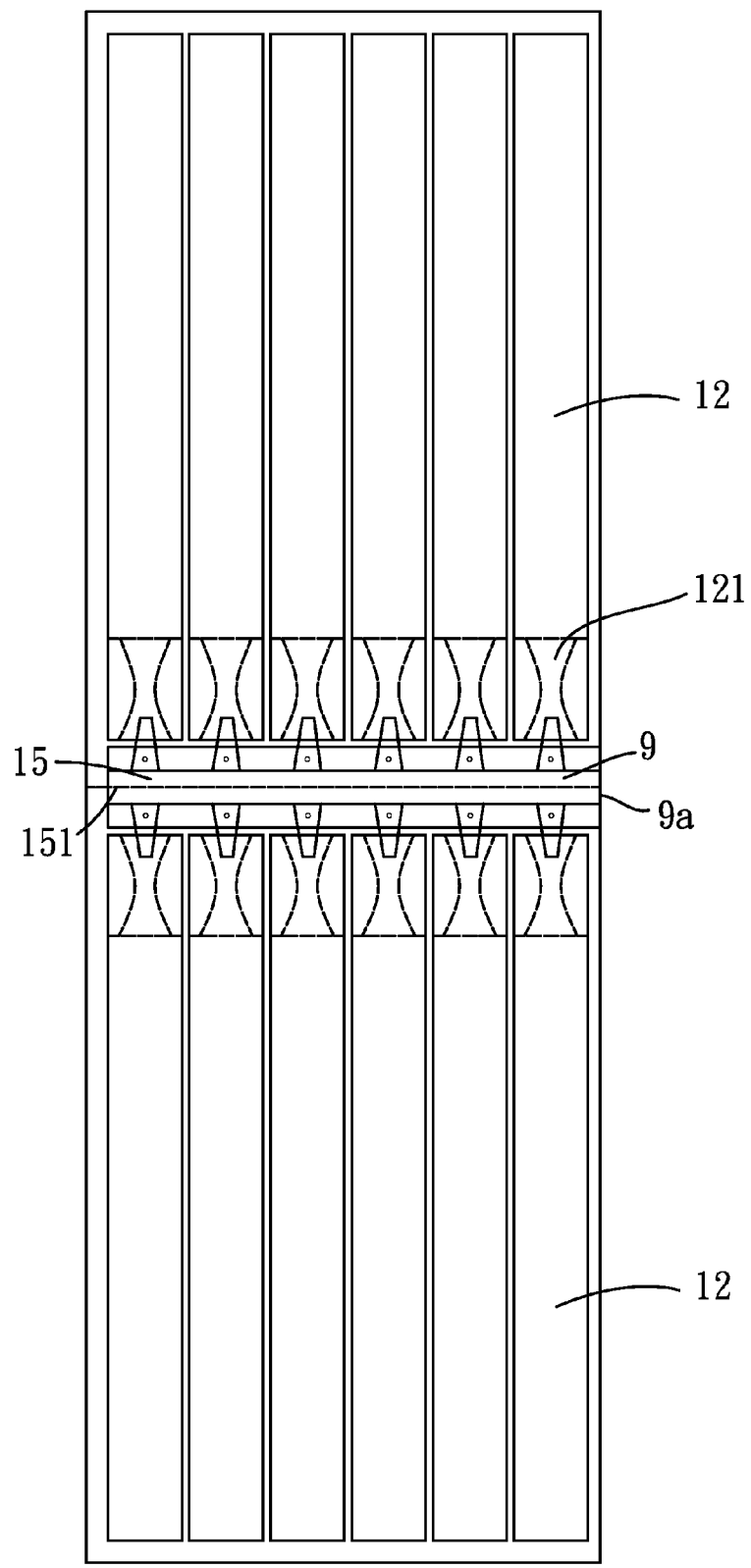
FIG. 8 is a plane view of the air enclosure shown in FIG. 7 before being filled with air.

The first hot sealing apparatus 54 hot-seals the first inner film 1*a* and the second inner film 1*b* to form the air filling passageway 9 with the air filling entrance 9*a* and in the meantime, hot-seals the first inner film 1*a* and the middle film 2*c* to form the first check valve 110 and form the first air passageway 111 between the first inner film 1*a* and the middle film 2*c*, hot seals the second inner film 1*b* and the middle film 2*c* to form the second check valve 120 and form the second air passageway 121 between the second inner film 1*b* and the middle film 2*c*, Please refer to FIGS. 7 and 8. FIG. 7 is a cross sectional view, showing another air enclosure manufactured by the apparatus shown in FIG. 1 after being filled with air. FIG. 8 is a plane view of the air enclosure shown in FIG. 7 before being filled with air.

After the middle film conveying unit 51 provides one sheet of middle film 2*c*, the inner film conveying unit 52 provides two sheets of first inner film 1*a* and two sheets of second inner film 1*b* to respectively stack on two sides of the middle film 2*c*, in which a heat resistant material 1*c* is spread in advance between the two sheets of first inner film 1*a* and between the two sheets of second inner film 1*b*, for example, by means of heat resistant resin or ink printing. The two sheets of first inner film 1*a* and the middle film 2*c* are adhered together through the first hot sealing apparatus 54 to form the first check valve 110 and the first air passageway 111 is formed between the two sheets of first inner film 1*a* and in the meantime, the two sheets of second inner film and the middle film 2*c* are adhered together by means of hot sealing to form the second check valve 120 and the second air passageway 121 is formed between the two sheets of second inner film 1*b*. And then, the first outer film 2*a* is provided to stack on an outer side of the first check valve and the second outer film 2*b* is provided to stack on an outer side of the second check valve through the outer film conveying unit 53. Furthermore, the middle film 2*c* and the first outer film 2*b* are adhered to each other to form the first air chamber 11 and in the meantime, the middle film 2*c* and the second outer film 2*b* are adhered to each other to form the second air chamber 12 through the second hot sealing apparatus. Besides, middle parts of the first outer film 2*a* and the second outer film 2*b* are adhered to each other by means of hot sealing to form the air filling entrance 9 with the air filling entrance 9*a* between the first outer film 2*a* and the second outer film 2*b* to cause the air chambers 11 to be disposed side by side at two sides of the air filling passageway 9.

Besides, the first hot sealing apparatus 54 may also be used to hot-seal the middle parts of the first inner film 1*a* and the second inner film 1*b* or the second hot sealing apparatus 55 is used to hot-seal the first outer film 2*a* and the second outer film 2*b* to form the air filling passageway 9 with the air filling entrance 9*a* between the first inner film 1*a* and the second inner film 1*b* to cause the air chambers 11 to be disposed side by side at two sides of the air filling passageway 9.

A method for manufacturing a double layer air cylinder type air enclosure comprises the following steps:

Step 1: providing at least one sheet of middle film 2c through a middle film conveying unit 51.

Step 2: stacking a first inner film 1a and a second inner film 1b to allow the middle film 2c to be lain between the first inner film 1a and the second inner film 1b, in which a heat resistant material 1c is spread in advance on the first inner film 1a and the second inner film 1b, or the heat resistant material 1c is spread in advance between the plurality of first inner films 1a and the plurality of second inner films 1b.

Step 3: hot-sealing the first inner film 1a and the middle film 2c to form a first check valve 110 through a first hot sealing apparatus 54 and forming a first air passageway 111 between first inner films 1a, or forming the first air passageway 111 between the first inner film 1a and the middle film 2c and in the meantime, hot-sealing the second inner film 1b and the middle film 2c to form a second check valve 120, and forming a second air passageway 121 between the second inner films 1b, or forming the second air passageway 121 between the second inner film 1b and the middle film 2c.

Step 4: providing a first outer film 2a to stack on the outside of the first check valve 110 and providing a second outer film 2b to stack on the outside of the second check valve 120 through the outer film conveying unit 53 to allow the first inner film 1a, the second inner film 1b and the middle film 2c to be lain between the first outer film 2a and the second outer film 2b.

Step 5: using a second hot sealing apparatus 55 to hot-seal the middle film 2c and the first outer film 2a to form a first air chamber 11 and in the meantime, hot-seal the middle film 2c and the second outer film 2b to form a second air chamber 12.

Furthermore, the second hot sealing apparatus 55 is used to hot-seal one end of the first outer film 2a and one end of the second outer film 2b to form an air filling passageway 9 with an air filling entrance 9a between the first outer film 2a and the second outer film 2b, or form the air filling passageway 9 with the air filling entrance 9a between the first inner film 1a and the second inner film 1b. Besides, the first hot sealing apparatus 54 may also hot-seal one end of the first inner film 1a and one end of the second inner film 1b directly to form the air filling passageway 9 with the air filling entrance 9a between the first inner film 1a and the second inner film 1b.

Moreover, middles parts of the first outer film 2a and the second outer film 2b are adhered to each other by means of hot sealing to form the air filling passageway 9 with the air filling entrance 9a between the first outer film 2a and the second outer film 2b to cause the air chambers 11 to be disposed side by side at two sides of the air filling passageway 9.

In addition, middle parts of the first inner film 1a and the second inner film 1b are adhered to each other by means of hot sealing, or the first outer film 2a and the second outer film 2b are adhered to each other by means of hot sealing to form the air filling passageway 9 with the air filling entrance 9a between the first inner film 1a and the second inner film 1b to cause the air chambers 11 to be disposed side by side at two sides of the air filling passageway 9

Figure 9:
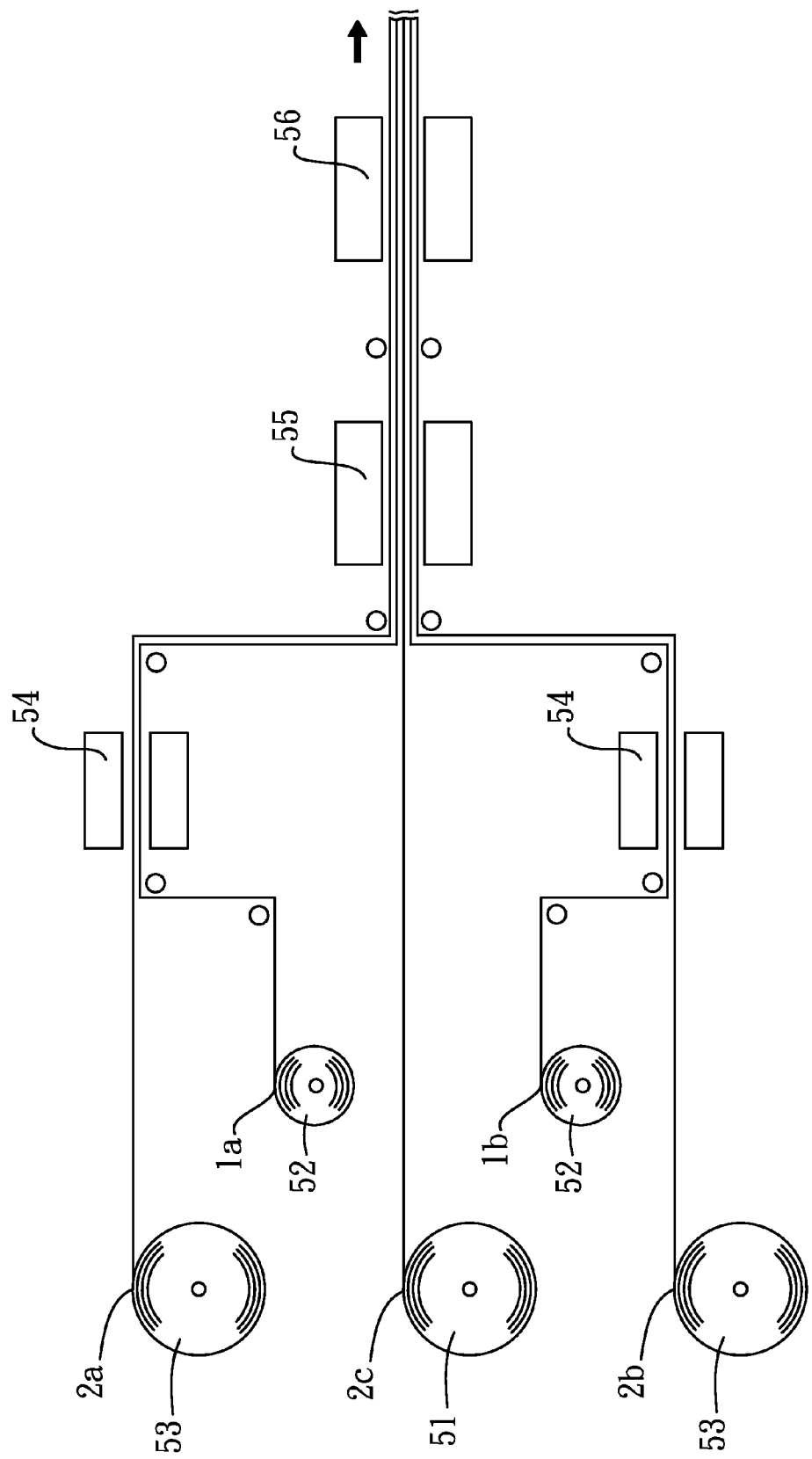
FIG. 9 is a schematic view, showing a structure of an apparatus for manufacturing a double layer air cylinder type air enclosure of a second preferred embodiment according to the present invention.
Figure 10:
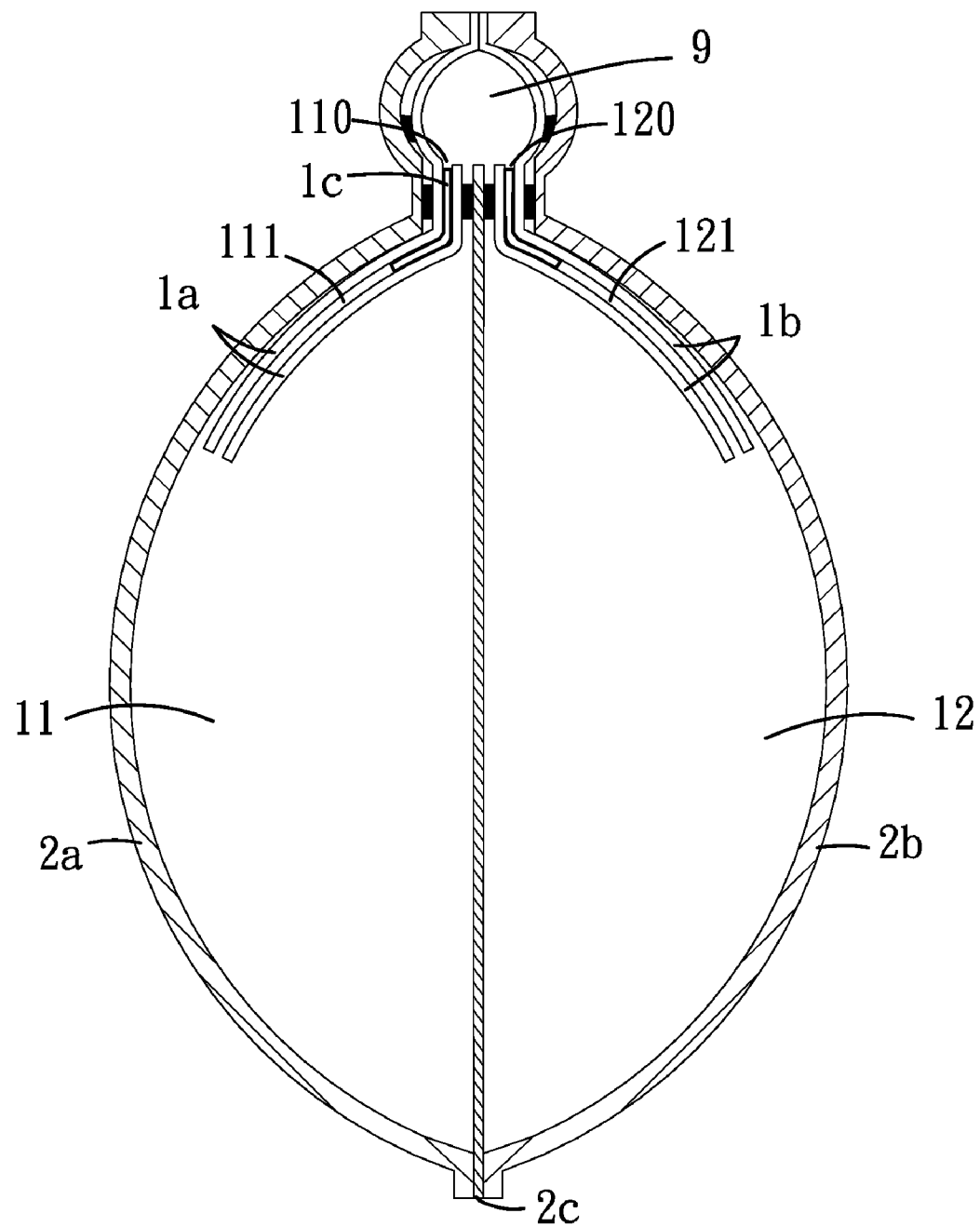
FIG. 10 is a cross sectional view, showing an air enclosure manufactured by the apparatus shown in FIG. 9 after being filled with air.
Figure 11:
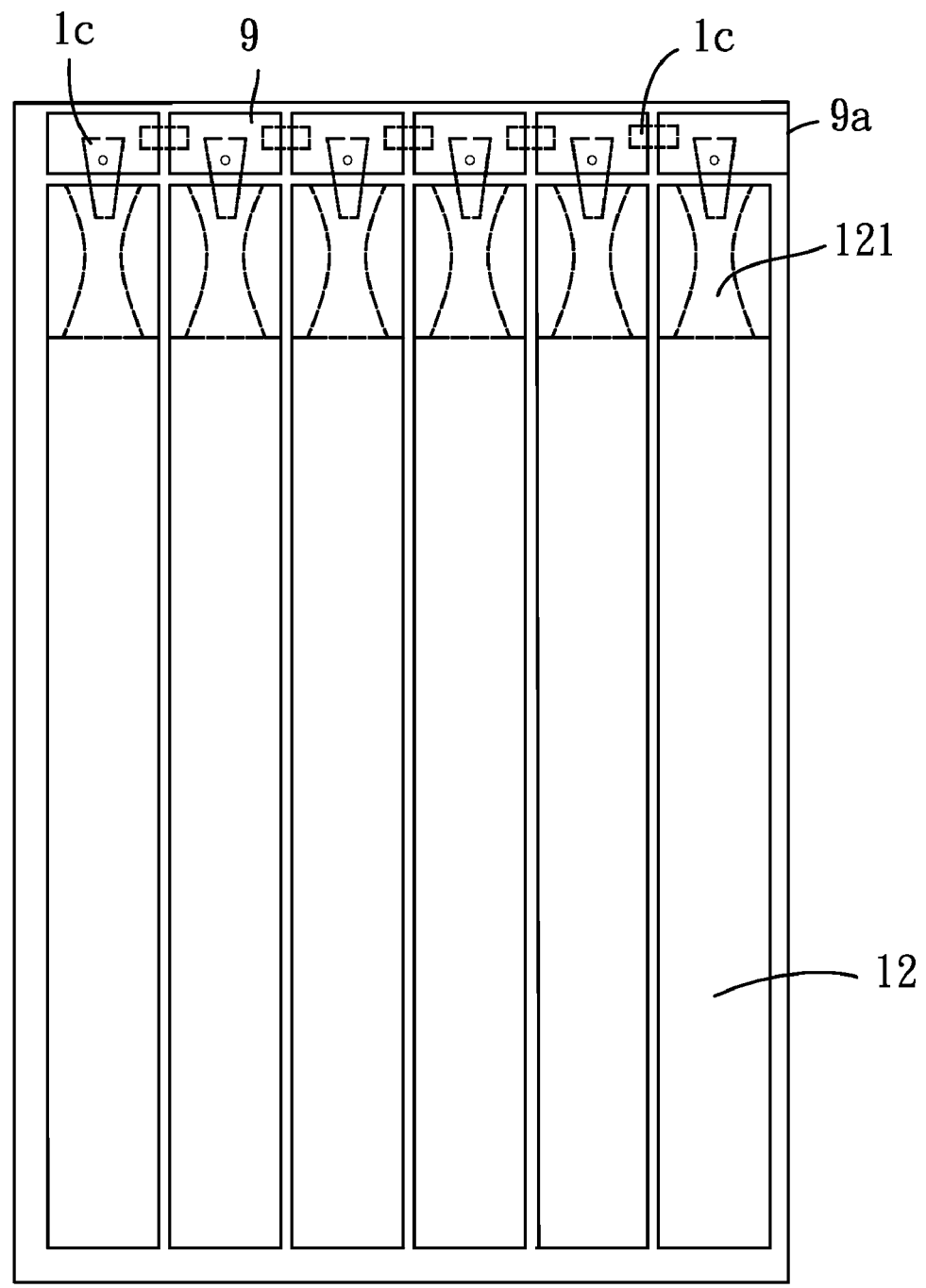
FIG. 11 is a plane view of the air enclosure shown in FIG. 10 before being filled with air.

Please refer to FIGS. 9, 10 and 11. FIG. 9 is a schematic view, showing a structure of an apparatus for manufacturing a double layer air cylinder type air enclosure of a second preferred embodiment according to the present invention. FIG. 10 is a cross sectional view, showing an air enclosure manufactured by the apparatus shown in FIG. 9 after being filled with air. FIG. 11 is a plane view of the air enclosure shown in FIG. 10 before being filled with air.

An apparatus for manufacturing a double layer air cylinder type air enclosure comprises a middle film conveying unit 51, a inner film conveying unit 52, a outer film conveying unit 53, a first hot sealing apparatus 54 and a second hot sealing apparatus 55.

An outer film conveying unit 53 is used for providing a first outer film 2a and a second outer film 2b.

An inner film conveying unit 52 is used for providing at least one sheet of first inner film 1a and at least one sheet of second inner film 1b to stack to stack between the first outer film 2a and the second outer film 2b.

A first hot sealing apparatus 54 is used for hot-sealing the first inner film 1a and the first outer film 2a to form a first check valve 110 with a first air passageway 111, and hot-sealing the second inner film 1b and the second outer film 2b to form a second check valve 120 with a second air passageway 121.

A middle film conveying unit 51 is used for providing at least one sheet of middle film 2c to lie between the first inner film 1a and the second inner film 1b.

A second hot sealing apparatus 55 is used for hot-sealing the first outer film 2a, the second outer film 2b and the middle film 2c to allow the middle film 2c and the first outer film 2a to form a first air chamber 11, and allow the middle film 2c and the second outer film 2b to form a second air chamber 12.

A structure disclosed by the present invention further comprises a node hot-sealing unit 56 used for hot-sealing the first outer film 2a and the second outer film 2b to form a plurality of nodes to enable the first air chamber and the second air chamber 12 may be bended along the plurality of nodes.

After the outer conveying unit 53 provides the first outer film 2a and the second outer film 2b, the inner film conveying unit 52 provides the two sheets of first inner film 1a and the two sheets of inner film 1b to stack between the first outer film 2a and the second outer film 2b, in which a heat resistant material 1c is spread in advance between the two sheets of first inner film 1a and the two sheets of second inner film 1b, for example, by means of heat resistant resin or ink printing. The two sheets of first inner film 1a and the first outer film 2a are adhered to form the first check valve 110 through the first hot sealing apparatus 54 and the first air passageway 111 is formed between the two sheets of first inner film 1a by means of hot sealing and in the meantime, the two sheets of second inner film 1b and the second outer film 2b are adhered to form the second check valve 120 and the second air passageway 121 is formed between the two sheets of second inner films 1b. Next, the middle film conveying unit 51 is used to provide the at least one middle film 2c to lie between the first inner film 1a and the second inner film 1b, and the second hot sealing apparatus 55 is then used to hot-seal the first inner film 1a and the second inner film 1b to form the air filling passageway 9 with the air filling entrance 9a, and the second hot sealing apparatus 55 is used to hot-seal the middle film 2c and the first outer film 2a to form the first air chamber 11 and in the meantime, the middle film 2c and the second outer film 2b are adhered to form the second air chamber 12 by means of hot sealing.

Besides, the second hot sealing apparatus 55 may also be used for hot-seal one end of the first outer film 2a and one end of the second outer film 2b to form the air filling passageway 9 with the air filling entrance 9a between the first outer film 2a and the second outer film 2b or form the air filling passageway 9 with the air filling entrance 9a between the first inner film 1a and the second inner film 1b.

Air entering the air filling entrance 9a expands the air filling passageway 9 to cause the two sheets of first inner films 1a to be pulled apart outward and in the meantime, cause the two sheets of second inner films 1b to be pulled apart outward thereby being capable of using air in the air filling passageway 9 to fill each first air chamber 11 and each second air chamber 12 with air to allow each first air chamber 11 and each second air chamber to be filled with air and expanded. Besides, the internal air pressure of the firs air chamber 11 compresses the two sheets of first inner films 1a to attach closely onto the first outer film 2a to cover the first air passageway 111 to seal the first air chamber 11. Furthermore, the internal air pressure of the second air chamber 12 compresses the two sheets of second inner film 1b to attach onto the second outer film 2b closely to cover the second air passageway 121 to shield the second air chamber 12 thereby being capable of allowing air in the first air chamber 11 and the second air chamber 12 not to be leaked out to attain to the air locking effect.

From the description mentioned above, not only air filling speeds of the first air chamber 11 and the second air chamber 12 can be faster to reduce the time needed for the air filling, but also when one of the first air chamber 11 and the second air chamber 12 is broken, another one is not influenced to keep air tight such that the cushioning protection can be still provided to maintain the shock absorbing cushioning capability because the first air chamber 11 and the second air chamber 12 are independent to each other.

Figure 12:
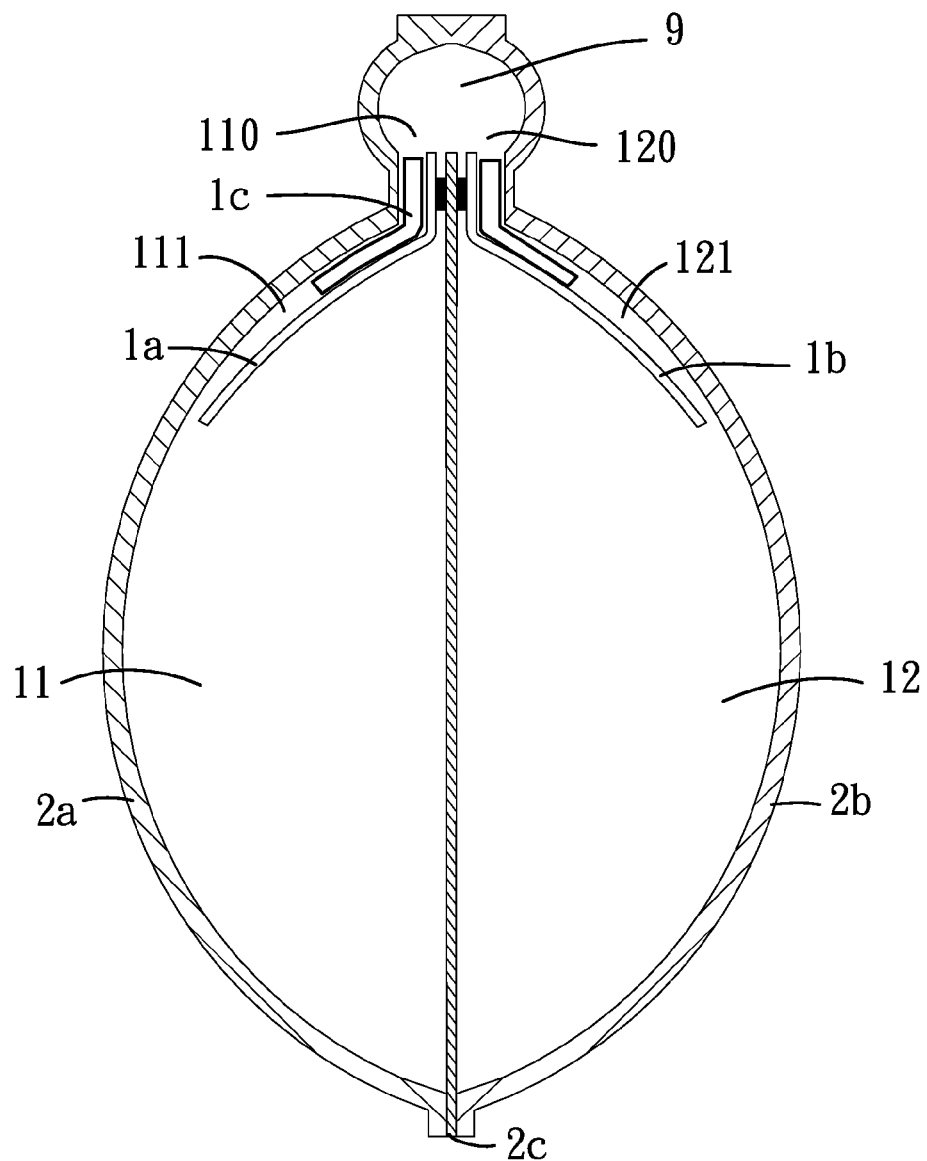
FIG. 12 is a cross sectional view, showing another air enclosure manufactured by the apparatus shown in FIG. 9 after being filled with air.

Please refer to FIG. 12. FIG. 12 is a cross sectional view, showing another air enclosure manufactured by the apparatus shown in FIG. 9 after being filled with air.

After the outer conveying unit 53 provides the first outer film 2a and the second outer film 2b, the inner film conveying unit 52 provides the one sheet of first inner film 1a and the one sheet of inner film 1b to stack between the first outer film 2a and the second outer film 2b, in which a heat resistant material 1c is spread in advance on the first inner film 1a and the second inner film 1b, for example, by means of heat resistant resin or ink printing. The first inner film 1a and the first outer film 2a are adhered to form the first check valve 110 through the first hot sealing apparatus 54 and the first air passageway 111 is formed between the first inner film 1a and the first outer film 2a by means of hot sealing and in the meantime, the second inner film 1b and the second outer film 2b are adhered to each other to form the second check valve 120 and the second air passageway 121 is formed between the second inner films 1b and the second outer film 2b. Next, the middle film conveying unit 51 is used to provide the at least one middle film 2c to lie between the first inner film 1a and the second inner film 1b, and the second hot sealing apparatus 55 is then used to hot-seal the first outer film 2a and the second outer film 2b to form the air filling passageway 9 with the air filling entrance 9a between the first outer film 2a and the second outer film 2b, and the second hot sealing apparatus 55 is used to hot-seal the middle film 2c and the first outer film 2a to form the first air chamber 11 and in the meantime, the middle film 2c and the second outer film 2b are adhered to each other to form the second air chamber 12 by means of hot sealing.

According to a structure disclosed by the present invention, the second hot sealing apparatus 55 hot-seals the middle film 2c and the first outer film 2a to form the first air chamber 11 and in the meantime, may hot-seal middle parts of the first outer film 2a and the second outer film 2b to form the air filling passageway 9 with the air filling passageway 9a between the first outer film 2a and the second outer film 2b after hot-sealing the middle film 2c and the second outer film 2b to form the second air chamber 12 to cause the air chambers 11 to be disposed side by side at two sides of the air filling passageway 9. Besides, the second hot sealing apparatus 55 may also be used to hot-seal middle parts of the first inner film 1a and the second inner film 1b, or the second hot sealing apparatus 55 is used to hot-seal the first outer film 2a and the second outer film 2b to form the air filling passageway 9 with the air filling entrance 9a between the first inner film 1a and the second inner film 1b to cause air chambers 11 to be disposed side by side at two sides of the air filling passageway 9, Another method for manufacturing a double layer air cylinder type air enclosure comprises the following steps:

Step 1: using an outer film conveying unit 53 to provide a first outer film 2a and a second outer film 2b.

Step 2: using an inner film conveying unit 52 to provide a first inner film 1a and a second inner film 1b to stack between the first outer film 2a and the second outer film 2b, in which a heat resistant material 1c is spread in advance on the first inner film 1a and the second inner film 1b.

Step 3: using a first hot sealing apparatus 54 to hot-seal the first inner film 1a and the first outer film 2a to form a first check valve 110 and form a first air passageway 111 between the first inner films 1a, or form the first air passageway 111 between the first inner film 1a and the second outer film 2b and in the meantime, hot seal the second inner film 1b and the second outer film 2b to form a second check valve 120 and form a second air passageway 121 between the second inner films 1b, or form the second air passageway 121 between the second inner film 1b and the second outer film 2b.

Step 4: using a middle film conveying unit 51 to provide at least one middle film 2c.

Step 5: stacking the middle film 2c to lie between the first inner film 1a and the second inner film ib.

Step 6: using a second hot sealing apparatus 55 to hot-seal the middle film 2c and the first outer film 2a to form a first air chamber 11 and in the meantime, hot-seal the middle film 2c and the second outer film 2b to form a second air chamber 12.

Furthermore, the second hot sealing apparatus 55 is used to hot-seal one end of the first outer film 2a and one end of the second outer film 2b to form an air filling passageway 9 with an air filling entrance 9a between the first outer film 2a and the second outer film 2b, or form the air filling passageway 9 with the air filling entrance 9a between the first inner film 1a and the second inner film 1b. Besides, the first hot sealing apparatus 54 may also hot seal one end of the first inner film 1a and one end of the second inner film 1b directly to form the air filling passageway 9 with the air filling entrance 9a between the first inner film 1a and the second inner film 1b.

Moreover, middle parts of the first inner film 1a and the second inner film 1b may also be adhered to each other or the first outer film 2a and the second outer film 2b may also be adhered to each other by means of hot sealing to form the air filling passageway 9 with the air filling entrance 9a between the first outer film 2a and the second outer film 2b to cause the air chambers 11 to be disposed side by side at two sides of the air filling passageway 9.

Besides, the middle parts of the first inner film 1a and the second inner film 16 may also be adhered to each other or the first outer film 2a and the second outer film 2b may also be adhered to each other by means of hot sealing to form the air filling passageway 9 with the air filling entrance 9a between the first inner film 1a and the second inner film 1b to cause the air chamber 11 to be disposed side by side at two sides of the air filling passageway 9.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A method for manufacturing a double layer air cylinder type air enclosure, comprising the steps of:
providing at least one middle film sheet;
providing two first inner film sheets, two second inner film sheets and first and second outer film sheets;
spreading a first heat resistant material between the two first inner film sheets and spreading a second heat resistant material between the two second inner film sheets;
stacking the two first inner film sheets, the middle film sheet and the two second inner film sheets so that the two first inner film sheets are laid on one side of the middle film sheet and the two second inner film sheets are laid on the other side of the middle film sheet;
hot-sealing the middle film sheet, the two first inner film sheets and the two second inner film sheets to form a first check valve with a first air passageway and a second check valve with a second air passageway on two respective sides of the middle film sheet, wherein the length of one of the two first inner film sheets is shorter than the length of the other of the two first inner film sheets, the one of the two first inner film sheets is more adjacent to the middle film sheet than the other of the two first inner film sheets, the length of one of the two second inner film sheets is shorter than the length of the other of the two second inner film sheets, and the one of the two second inner film sheets is more adjacent to the middle film sheet than the other of the two second inner film sheets;
stacking the first and second outer film sheets so the middle film sheet, the two first inner film sheets and the two second inner film sheets are laid between the two outer film sheets;
hot-sealing ends or middle parts of the two outer film sheets to form an air filling passageway;
adhering the two outer film sheets to one of the two first inner film sheets and one of the two second inner film sheets at respective combination points in the air filling passageway; and
hot-sealing the two outer film sheets and the middle film sheet to form a first air storable air chamber between the middle film sheet and the first outer film sheet, and a second air storable air chamber between the middle film sheet and the second outer film sheet,
wherein the first and second air passageways connect the air filling passageway with the first and second air chambers, respectively, so that air enters the air filling passageway and immediately flows into the two air chambers via the two air passageways to fill and expand the two air chambers with air, and air in the two air chambers compress the two check valves to close the air passageway to prevent air in the two air chambers from leaking out to attain air locking.

2. The method for manufacturing a double layer air cylinder type air enclosure according to claim 1, wherein ends or middle parts of one of the first inner film sheets and one of the second inner film sheets are adhered to each other by means of hot sealing to form an air filling passageway in the step of hot-sealing the middle film, the two first inner film sheets and the two second inner film sheets to allow two sides of the middle film to be respectively formed with a check valve with an air passageway.

3. The method for manufacturing a double layer air cylinder type air enclosure according to claim 1, wherein the hot-sealing to form the two check valves, includes adhering the two first inner film sheets to the middle film sheet to form the first check valve and form the first air passageway between the two first inner film sheets by means of hot sealing, and adhering the two second inner film sheets and the middle film sheet to form the second check valve and form the second air passageway between the two second inner film sheets by means of hot sealing.

4. The method for manufacturing a double layer air cylinder type air enclosure according to claim 1, wherein the hot-sealing to form the two check valves, includes adhering one of the two first inner film sheets to the middle film sheet to form the first check valve and form the first air passageway between the two first inner film sheets, and adhering one of the two second inner film sheets to the middle film sheet to form the second check valve and form the second air passageway between the two second inner film sheets.

5. The method for manufacturing a double layer air cylinder type air enclosure according to claim 1, wherein the two outer film sheets are stacked on outer sides of the first check valve and the second check valve, respectively.

6. The method for manufacturing a double layer air cylinder type air enclosure according to claim 1, further comprising:
hot-sealing the first and second outer film sheets to form a plurality of nodes so that the first and second air chambers are bended along the plurality of nodes.

7. The method for manufacturing a double layer air cylinder type air enclosure according to claim 1, wherein the heat resistant materials are spread by means of heat resistant resin or ink printing.

8. The method for manufacturing a double layer air cylinder type air enclosure according to claim 1, wherein the first and second air passageways connect the air filling passageway with the first and second air chambers, respectively, so that air entering the air filling passageway pulls away the two first inner film sheets and the two second inner film sheets onward to fill and expand the first and second air chambers with air.

9. The method for manufacturing a double layer air cylinder type air enclosure according to claim 1, wherein air in the first air chamber compresses the two first inner film sheets to attach onto the middle film sheet closely to cover the first air passageway to close the first air chamber, and air in the second air chamber compresses the two second inner film sheets to attach onto the middle film sheet closely to cover the second air passageway to close the second air chamber.

* * * * *